April 6, 1965

R. E. ERICSON 3,176,691

CATHETER TUBING CLAMP

Filed May 8, 1963

Inventor:
Richard E. Ericson
By James I. Fawcett
Atty.

United States Patent Office 3,176,691
Patented Apr. 6, 1965

3,176,691
CATHETER TUBING CLAMP
Richard Evan Ericson, Barrington, Ill., assignor to The Kendall Company, Boston, Mass., a corporation of Massachusetts
Filed May 8, 1963, Ser. No. 278,836
3 Claims. (Cl. 128—349)

This invention is concerned with tubing clamps, particularly with the type of clamp which optionally may be strung like a bead onto compressible hollow tubing and which provides means to open and close the tubing channel.

The clamps of this invention have particular utility in conjunction with hospital tubing, such as drainage tubing.

Some of the desirable features which a good tubing clamp should have are ease of operation, simplicity, effectiveness and rapid action.

It is an object of this invention to provide a simple, one-piece clamp which can be opened almost instantly with a thumb and forefinger yet which effectively and instantaneously seals the tubing channel when the clamp is permitted to automatically resume its normal position on the tubing.

It is a further object of this invention to provide a clamp which in conjunction with certain catheters has an important secondary function in providing positive ejection of inflationary fluid from the storage chamber of the catheter to inflate the retention balloon thereof.

These and other objects of the invention will be apparent from further portions of the specification and from the drawings in which.

Figure 2:
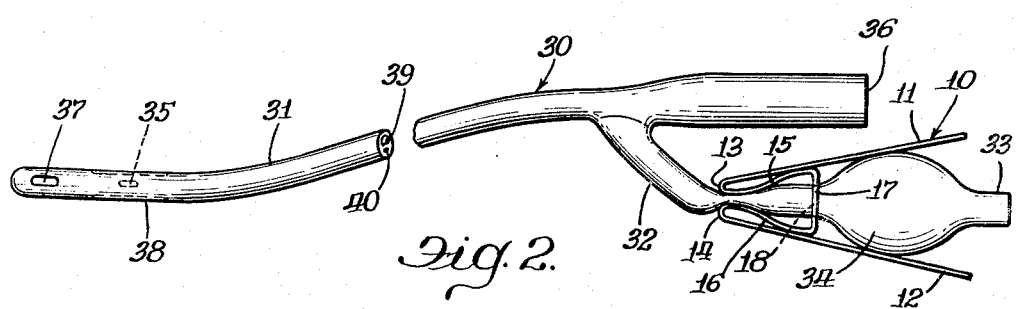
FIGURE 2 is a side view of the clamp of FIGURE 1 strung on a catheter and illustrating a typical clamping use.
Figure 3:
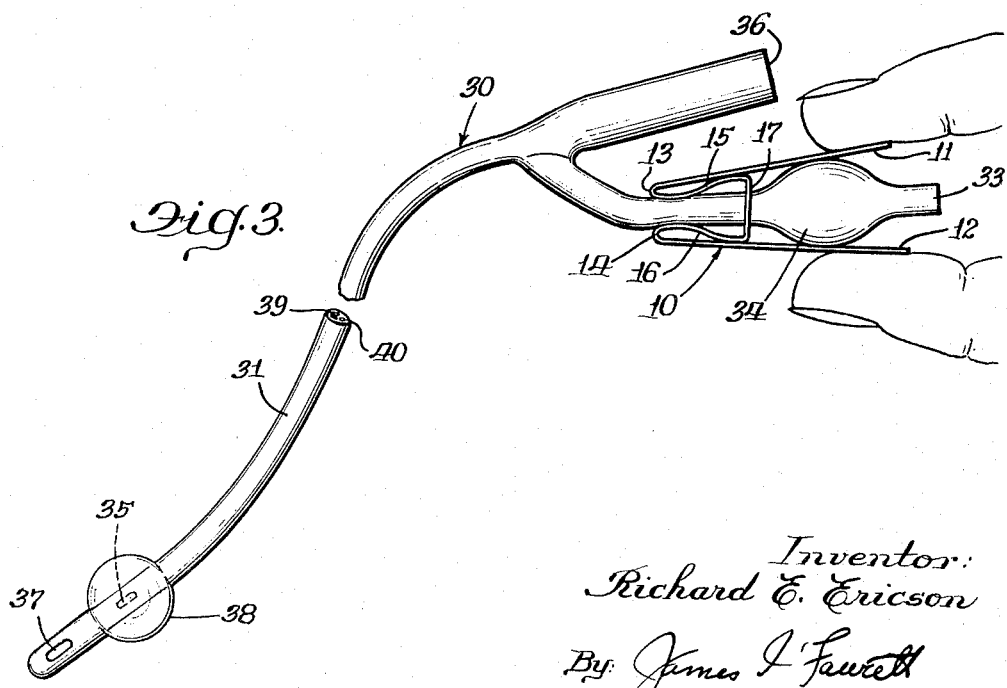
FIGURE 3 is a side view of the clamp of FIGURE 1 in the open position and illustrating the secondary function of the clamp.

Catheters of the general type shown in FIGURES 2 and 3 in which an inflated chamber is clamped off until the catheter is inserted into the bladder and then released to inflate a retention balloon are effective so long as the pressure on the fluid chamber is sufficient to inflate the balloon. Very frequently, however, the pressure of the fluid is insufficient either due to loss of resiliency of the chamber walls, loss of fluid through the chamber walls, resistance to inflation by the balloon walls or for some other reason. Some catheters are even designed so that the pressure which maintains the chamber inflated is less than that which will inflate the balloon. With all such catheters it may be necessary to apply external pressure to the chamber with the tube open and then, with the chamber deflated, to close the tube. The clamps of this invention are admirably fitted to carry out the necessary sequential steps of opening the channel, deflating the chamber and closing the channel all with a single application of pressure with the thumb and forefinger followed by release of this manual pressure.

Figure 1:
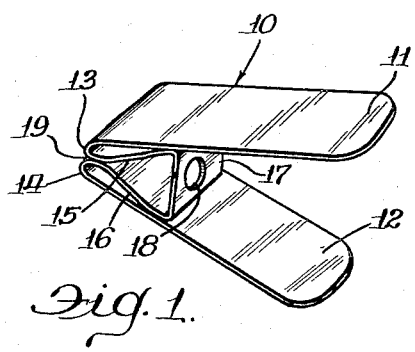
FIGURE 1 is an isometric view of a typical clamp of this invention showing its one-piece construction.

Referring once more to the drawings:

In FIGURE 1, a typical clamp 10 of the invention is formed from an integral band of spring steel, preferably stainless steel, or other metal or material with sufficient springiness. The band, which has substantially less width than length, is shaped by a series of transverse bends into a form resembling the capital letter A. The wing ends 11 and 12 which constitute the clamp operating or grip ends correspond to the legs, the lip-like reverse bends 13 and 14 correspond to the apex and the bridge or pivot portion 17 corresponds to the bridge of the A. When the clamp is not in use, the wing ends 11 and 12 are generally in an unstrained relaxed condition. The portions 13 and 14, however, the jaw portions 15 and 16 and the pivot or bridge portion 17 are elastically displaced from their relaxed positions even when the clamp is not in use. The elastic forces tending to relieve this elastic deformation causes the lip-like portions 13 and 14 to press together with some force forming the nip 19. When the portions 13 and 14 are forced apart, the elastic strain is increased and the forces pressing the portions 13 and 14 towards each other are increased. Resilient rubber, plastic or other readily-collapsed tubing, when placed in the nip of the clamp, has its channel squeezed shut when the external forces holding the clamp open are released.

Normally when the grip ends 11 and 12 of the clamp are pressed toward each other, they tend to bow inwardly bending from the pivot portion if they touch the pivot portion or from the reverse bends of the lip-like portions otherwise. At any rate, there is a certain resistance to bending which usually is combined with a see-saw effect. The net result is that the lips are pulled apart opening the nip 19. With the clamp jaws open, a piece of tubing of proper size may be inserted endwise into the nip of the clamp and through the hole 18 in the pivot portion 17. The clamp is thus strung like a bead on the tubing and clamps the channel of the latter closed unless the clamp is forcibly held open.

Where more pressure clamping the channel shut may be desired this may be obtained by causing the pivot portion 17 to be shaped arcuately, preferably being dished in toward the lips to form a partial cylinder. The hole 18 is optional but highly desirable and is essential if the clamp is to have a dual function.

In FIGURE 2, the clamp 10 is shown with the side arm 32 of catheter 30 threaded through the hole 18 in the pivot portion 17. In practice the clamp 10 is placed in position before the chamber 34 of the catheter is inflated. Normally inflation with sterile liquid is done with a hypodermic needle inserted through the rubber-plugged end 33 of the side arm. The lips 13 and 14 of the clamp close the channel of the side arm 32. This channel connects directly with channel 40 in the main arm 31 of the catheter and with the port 35 of the deflated balloon 38. The main arm also contains the drainage channel 39 which connects the drainage port 37 and the funnel-shaped chamber 36 of the catheter. The catheter may be used for application of fluids as well as drainage as is well known.

In FIGURE 3, the catheter and clamp of FIGURE 2 are shown with the clamp grip ends 11 and 12 partially flexed and depressed to further open the clamp lips 13 and 14 and further flex portions 15, 16 and 17. When the chamber 34 is under relatively high pressure and the balloon 38 is relatively easily inflated, the grip ends 11 and 12 may never exert much pressure on the chamber 34. If, however, for some reason the chamber 34 is unable to inflate the balloon 38 automatically, the grip ends 11 and 12 will exert positive pressure on the chamber 34 and thus cause the balloon 38 to inflate. When pressure on the clamp grip ends is released, the clamp will automatically immediately close the side arm channel so as to prevent deflation of the balloon 38.

If the chamber 34 automatically inflates the balloon 38 so that no clamp is necessary thereafter on the side arm 32, the clamp 10 may be removed over the deflated chamber 34 and applied elsewhere, for instance, as a clamp on the main arm of the catheter when fluids have been injected or to prevent drainage of urine at undesirable times.

Figure 4:
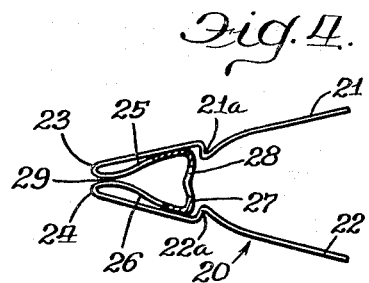
FIGURE 4 is a side view of a slightly modified form of the clamp of this invention.

In FIGURE 4, a modified form of the clamp of the invention 20 is shown. The grip ends 21 and 22 of this clamp are shown to have indentations 21a and 22a which make the grip ends more nearly approach the shape of an inflated catheter chamber. This shape may be more efficient in applying pressure to certain types of chambers where that is an important function. The lips 23 and 24 separate as before when grip ends 21 and 22 are elastically flexed by being pressed toward each other causing the nip 29 to open and causing the portions 25 and 26 and the pivot portion 27 to elastically flex. The hole 28 again is optional.

By properly controlling the bending, the nips 19 and 29 may be made to have greater or less nip contact area with the tubing which is being clamped shut. Obviously, as the area of nip contact is increased, the pressure per unit area is decreased and vice versa other things being equal.

The clamps of this invention, although they are inexpensive enough to form part of a disposable unit, are of such quality that they may be used over and over, either as sterile or nonsterile clamps, and will continue to adequately perform the functions which superior clamps should perform, particularly if they are made of stainless steel.

I claim:

1. In combination, a spring clamp and a retention type catheter, said catheter having a flexible tubelike main arm containing a main channel including a connection end leading thereinto and an auxiliary channel, said main arm terminating at its other extremity in an insertion end suitable for introduction into an animal body, said insertion end containing an aperture into said main channel and being fastened to a collapsed balloon, said balloon being connected to said auxiliary channel and being inflatable, after said introduction, by fluid therefrom, said auxiliary channel being an extension of a side arm channel diverting from said main arm and contained in a side arm attached to said main arm adjacent the connecting end thereof, said side arm channel leading into a fluid inflated chamber in said side arm, the fluid in said chamber being retained therein by closure of said side arm channel by the nip pressure of said spring clamp, said spring clamp being formed of an integral spring-metal ribbon by a series of transverse bends into a form resembling a capital A, the nip of said clamp comprising two lip-like reverse bends in spring contact with and compressing said side arm and corresponding to the top of the A, the two ends of said ribbon constituting finger gripping ends of said clamp corresponding to the legs of said A, and the bridge of said clamp corresponding to the bridge of said A formed by filleted transverse bends in that portion of said ribbon intermediate the lip-like reverse bends, there being a hole in said bridge through which said side arm is threaded, said inflated chamber of said side arm being situated between said finger gripping ends and being separated by said bridge from that portion of said side arm compressed by the nip of said spring, whereby pressure urging said finger gripping ends into closer relationship separates the lips comprising the nip of said spring, releases the nip pressure closing the channel of said side arm and compresses the inflated chamber of said side arm causing fluid to move from asid chamber into the side arm channel hence into the auxiliary channel and finally into the collapsed balloon to inflate the same.

2. The combination of claim 1 wherein the bridge of the spring clamp is arched toward the nip.

3. The combination of claim 1 wherein that portion of the spring clamp between the nip and each of the finger gripping ends is indented transversely of the ribbon between the bridge of said clamp and the inflated chamber of said catheter whereby deflation of said chamber is facilitated.

References Cited in the file of this patent

UNITED STATES PATENTS

| | | |
|---|---|---|
| 1,491,286 | Calhoun | Apr. 22, 1924 |
| 1,865,453 | Baltzley | July 5, 1932 |
| 1,922,084 | Gerow | Aug. 15, 1933 |
| 2,173,527 | Agayoff | Sept. 19, 1939 |
| 2,259,505 | Wisdom | Oct. 21, 1941 |
| 2,636,240 | Pokorny | Apr. 28, 1953 |
| 2,682,874 | Hickey | July 6, 1954 |
| 3,053,257 | Birtwell | Sept. 11, 1962 |

FOREIGN PATENTS

| | | |
|---|---|---|
| 477 | Great Britain | 1887 |